United States Patent [19]
Helmsderfer

[11] Patent Number: 5,901,739
[45] Date of Patent: May 11, 1999

[54] COVER ASSEMBLY WITH INTEGRAL SECURING APPARATUS FOR COVERING UNDERSINK PIPING

[76] Inventor: John A. Helmsderfer, 2151 Luray Ave., Cincinnati, Ohio 45206

[21] Appl. No.: 08/756,550

[22] Filed: Nov. 26, 1996

Related U.S. Application Data

[63] Continuation-in-part of application No. 08/675,779, Jul. 15, 1996, Pat. No. 5,649,566, and application No. 08/742,507, Nov. 1, 1996, Pat. No. 5,701,929, which is a continuation-in-part of application No. 08/735,132, Oct. 22, 1996, Pat. No. 5,699,828, which is a continuation-in-part of application No. 08/490,599, Jun. 6, 1995, Pat. No. 5,685,328, which is a continuation-in-part of application No. 08/337,971, Nov. 14, 1994, Pat. No. 5,564,463, which is a continuation-in-part of application No. 08/271,439, Jul. 7, 1994, Pat. No. 5,586,568, which is a continuation-in-part of application No. 08/146,999, Oct. 29, 1993, Pat. No. 5,341,830, said application No. 08/675,779, is a division of application No. 08/271,439.

[51] Int. Cl.$^6$ .................................. F16L 7/00; F16L 9/22
[52] U.S. Cl. ...................... 137/375; 137/247.49; 285/47; 138/155; 138/159
[58] Field of Search ................................ 137/375, 247.49; 285/45, 47; 138/104, 155, 156, 157, 158, 159, 160, 161, 178

[56] References Cited

U.S. PATENT DOCUMENTS

| | | |
|---|---|---|
| 313,958 | 3/1885 | Seymour . |
| 411,115 | 9/1889 | Wendell . |
| 438,507 | 10/1890 | Tracey . |
| 1,771,134 | 7/1930 | Morgan . |
| 1,814,134 | 7/1931 | Eige . |
| 2,078,606 | 4/1937 | LeGrand . |
| 2,140,308 | 12/1938 | Belshaw . |
| 2,449,265 | 9/1948 | Williams . |
| 2,650,180 | 8/1953 | Walker . |
| 2,761,949 | 9/1956 | Colton . |
| 2,841,203 | 7/1958 | Gronemeyer . |
| 2,937,662 | 5/1960 | Green . |
| 2,964,064 | 12/1960 | Jones . |
| 3,014,827 | 12/1961 | Clinchy et al. . |
| 3,153,546 | 10/1964 | Dunn . |
| 3,172,377 | 3/1965 | Dewar . |
| 3,177,528 | 4/1965 | Flower et al. . |
| 3,402,731 | 9/1968 | Martin . |
| 3,425,456 | 2/1969 | Schibig . |
| 3,556,158 | 1/1971 | Schneider . |
| 3,559,694 | 2/1971 | Volberg . |
| 3,598,157 | 8/1971 | Farr . |
| 3,650,299 | 3/1972 | Seiler et al. . |
| 3,790,418 | 2/1974 | Huvey et al. . |
| 3,801,140 | 4/1974 | Keller . |
| 3,804,438 | 4/1974 | Humphries et al. . |
| 3,960,181 | 6/1976 | Baur et al. . |
| 4,046,406 | 9/1977 | Press et al. . |
| 4,084,842 | 4/1978 | Stonitsch et al. . |
| 4,327,778 | 5/1982 | Williams . |
| 4,416,309 | 11/1983 | Salim . |
| 4,441,743 | 4/1984 | Steenbergen . |
| 4,463,780 | 8/1984 | Schultz et al. . |

(List continued on next page.)

FOREIGN PATENT DOCUMENTS

| | | |
|---|---|---|
| 1249974 | 2/1989 | Canada . |
| 2714576 | 5/1978 | Germany . |
| 0004201 | 2/1899 | United Kingdom . |

*Primary Examiner*—John Rivell
*Attorney, Agent, or Firm*—Wood, Herron & Evans, LLP

[57] ABSTRACT

An insulative cover piece for insulating a pipe of a P-trap drain piping assembly located under a sink comprises an elongated body formed of a flexible insulating material configured for being positioned over the pipe. A longitudinal slit formed in the body defines opposing edges so that the body is spreadable along the slit. A fastening structure is connected to the body proximate an edge on a side of the slit and the fastening structure is operable for engaging the other edge on the other side of the slit to span across the slit and hold the edges together to effectively close the slit without the need for a plurality of separate and difficult-to-manipulate fasteners.

23 Claims, 2 Drawing Sheets

U.S. PATENT DOCUMENTS

| | | |
|---|---|---|
| 4,465,307 | 8/1984 | deLange . |
| 4,473,244 | 9/1984 | Hill . |
| 4,484,386 | 11/1984 | Stonisch . |
| 4,516,278 | 5/1985 | Lamond . |
| 4,594,740 | 6/1986 | Tseronakis . |
| 4,595,615 | 6/1986 | Cohen . |
| 4,667,505 | 5/1987 | Sharp . |
| 4,669,509 | 6/1987 | Botsolas . |
| 4,705,302 | 11/1987 | Beiley . |
| 4,746,147 | 5/1988 | Walker . |
| 4,804,210 | 2/1989 | Hancock . |
| 4,830,060 | 5/1989 | Botsolas . |
| 4,838,318 | 6/1989 | Karakawa . |
| 4,840,201 | 6/1989 | Botsolas . |
| 4,930,543 | 6/1990 | Zuiches . |
| 5,002,716 | 3/1991 | Van Dijck . |
| 5,006,185 | 4/1991 | Anthony et al. . |
| 5,025,836 | 6/1991 | Botsolas . |
| 5,054,513 | 10/1991 | Trueb et al. . |
| 5,055,334 | 10/1991 | Lechuga . |
| 5,088,772 | 2/1992 | Van Dijck . |
| 5,158,114 | 10/1992 | Botsolas . |
| 5,163,469 | 11/1992 | Trueb et al. . |
| 5,183,299 | 2/1993 | Halberstrom et al. . |
| 5,193,786 | 3/1993 | Guenther . |
| 5,259,410 | 11/1993 | Trueb et al. . |
| 5,266,740 | 11/1993 | Hsu . |
| 5,303,730 | 4/1994 | Trueb et al. . |
| 5,341,830 | 8/1994 | Helmsderfer et al. . |
| 5,348,044 | 9/1994 | Eugene et al. . |
| 5,360,031 | 11/1994 | Trueb et al. . |
| 5,369,818 | 12/1994 | Barnum et al. . |
| 5,419,364 | 5/1995 | Trueb et al. . |
| 5,454,392 | 10/1995 | Trueb et al. . |
| 5,503,193 | 4/1996 | Nygaard . |
| 5,522,433 | 6/1996 | Nygaard . |
| 5,524,669 | 6/1996 | Trueb et al. . |
| 5,540,255 | 7/1996 | Trueb et al. . |
| 5,564,463 | 10/1996 | Helmsderfer . |
| 5,586,568 | 12/1996 | Helmsderfer . |
| 5,649,566 | 7/1997 | Helmsderfer . |

5,901,739

COVER ASSEMBLY WITH INTEGRAL SECURING APPARATUS FOR COVERING UNDERSINK PIPING

RELATED APPLICATIONS

This application is a continuation-in-part application of U.S. application Ser. No. 08/742,507, filed Nov. 1, 1996, entitled "Cover Assembly Having Rapid Installation Features for Covering Undersink Piping," now U.S. Pat. No. 5,701,929, which is a continuation-in-part of U.S. application Ser. No. 08/735,132, filed Oct. 22, 1996, entitled "Cover Assembly with Integral Measurement Indicia for Covering Undersink Piping," now U.S. Pat. No. 5,699,828, which is a continuation-in-part application of U.S. application Ser. No. 08/490,599 filed Jun. 6, 1995, entitled "Cover Assembly and Method for Covering Undersink Piping," now U.S. Pat. No. 5,685,328, which is a continuation-in-part application of U.S. application Ser. No. 08/337,971, entitled "Cover Assembly and Method for Covering Undersink Piping," filed Nov. 14, 1994, now U.S. Pat. No. 5,564,463, which is a continuation-in-part application of U.S. application Ser. No. 08/271,439 entitled "Cover Assembly and Method for Covering Undersink Piping," filed Jul. 7, 1994, now U.S. Pat. No. 5,586,568, which is a continuation-in-part application of U.S. application Ser. No. 08/146,999, entitled "Cover Assembly and Method for Covering Undersink Piping," filed Oct. 29, 1993, now U.S. Pat. No. 5,341,830; and this present application is also a continuation-in-part application of U.S. application Ser. No. 08/675,779, filed Jul. 15, 1996, and entitled "Cover Assembly and Method for Covering Undersink Piping," now U.S. Pat. No. 5,649,566, which is a divisional application of U.S. application Ser. No. 08/271, 439, noted above, and U.S. Pat. Nos. 5,586,568 and 5,341, 830 are both completely incorporated herein by reference in their entireties.

FIELD OF THE INVENTION

This invention relates generally to undersink piping such as P-trap drains and water supply piping, and specifically discloses an apparatus to cover and insulate undersink drain piping to protect a person from abrasions and burns which may be caused by contact with the piping.

BACKGROUND OF THE INVENTION

Conventionally, water which drains from a sink or basin, such as a restroom sink, travels through the drain opening of the sink and empties into undersink piping. The undersink piping directs the water from the sink into the building's waste water system. The undersink drain piping is commonly referred to as a "P-trap" drain assembly, and "P-trap" assemblies are common to many sinks in both commercial and residential applications.

The P-trap assembly generally includes a vertical pipe section which extends downwardly from the sink drain opening and extends below the sink to couple with a J-shaped pipe section. The J-shaped pipe section makes a 180° bend and then extends vertically upward to couple with an L-shaped pipe section which makes a 90° bend from the J-shaped section to extend generally horizontally into the wall to connect the P-trap with the waste water system of the building. The P-trap creates a vapor barrier preventing undesirable vapors from passing back into the building through the drain piping. The J-shaped section also serves the purpose of capturing or trapping any foreign objects which fall down the drain and which may become lodged in the waste water drainage system therefore clogging the system, hence the name "P-trap". Under the force of gravity, any foreign objects will sit in the bottom of the J-shaped section to be subsequently removed, such as by a plumber.

Also extending below sinks are hot and cold water supply pipes commonly referred to as supply water angle valves, which include supply line sections which extend generally horizontally from the wall to connect to a valve and faucet line sections that extend generally vertically upward from the valve to connect to the sink faucet apparatus.

Current building regulations require that restroom facilities in a public building, such as restroom sinks, be accessible to all people, including disabled persons and particularly those disabled persons who must use a wheelchair. Persons in wheelchairs must usually maneuver the chair partially under a restroom sink to access it. Since the water supply pipes and P-trap drain pipes protrude from the wall under the sink, there is a risk of abrasions to the person's legs from the hard piping or even burns from the temperature of the piping caused by the water passing therethrough. The current federal and state regulations regarding undersink piping, most notably the Americans With Disabilities Act (ADA), require that the P-trap and water supply piping be covered and insulated so as to protect a person using the sink from being burned or from incurring injuries from impact with the piping. As a result of these regulations, various methods and apparatuses have been utilized to try and adequately cover and insulate undersink P-traps and water supply piping.

In the past, one of the more popular methods of insulation was to utilize loose foam insulation which was wrapped around the piping. However, traditional foam insulation usually fits poorly and is difficult to secure resulting in wasted time and frustration by the plumber or other installer. Furthermore, the foam wrap, due to its poor fit and inadequate securing means, is not very aesthetically pleasing in its appearance. Additionally, the ribbed construction of a wrapped pipe leaves ridges and cavities which trap dirt and other bacteria under the sink.

Various other methods and apparatuses have been utilized to cover a P-trap and supply piping beneath a sink as is evidenced by various patents in the field. While many such devices adequately insulate the pipes, they have various drawbacks. For example many of these other devices and methods are difficult and time consuming to secure and use.

Securement of the devices around the drain piping is of particular importance because it is generally one of the more time consuming steps, and thus one of the more expensive steps, of the installation process. For example, many of the prior art devices for covering undersink pipes are slit for being spread apart and positioned around the pipes. A series of aligned holes are positioned on either side of the slit and fasteners are placed through the holes and secured to hold the insulation pieces in place. One popular fastener for such a purpose is an elongated piece which is threaded through the holes and which ratchets tight as one end is pulled through the other end, commonly referred to as a "cable tie". Another elongated fastener, which is the subject of U.S. Pat. No. 5,454,392, includes an end clamping piece which is pulled through the holes until it snaps into place while spanning the slit. A portion of the fastener is then broken away from the clamping piece which holds the slit closed. Another fastening structure is illustrated in U.S. Pat. No. 5,546,463 which is incorporated by reference herein in its entirety.

One particular drawback is that many of the prior art fasteners are separate from the insulation pieces and may become separated therefrom before or during installation. Since currently used fasteners are somewhat small, they are particularly susceptible to being lost or misplaced. As may be appreciated, an installer will have to maintain an adequate supply of fasteners and if they are lost or if the installer's supply runs out, they will have to look for more or obtain more before completing the installation. This significantly slows down the installation process and increases the overall cost of installation.

Improper installation is also a problem, since a separate fastener is required for each pair of aligned holes in the insulation piece for proper installation. If sufficient fasteners are not available, the installer may be tempted to make the installation without a fastener for each hole. Such a scenario is particularly likely if the installer has lost some of the fasteners. Skipping one or more holes may leave an exposed portion of the undersink piping, thereby partially defeating the purpose of the insulation pieces. Improper installation also makes the installation look sloppy and unappealing.

An additional drawback of existing fastening structures is that they are exposed once the installation is completed. The multiple cable ties or other fasteners stick out away from the cover pieces and thus may further make the installation look sloppy and improperly installed. This draws away from the aesthetic look of the insulation. Furthermore, the fasteners provide areas for dust and germs to collect on the insulation.

Another problem with existing undersink insulation products is that they are difficult to remove once installed. Prior art fastening structures are designed for permanent installation and generally cannot be undone without breaking the fastener. If work must be done on the undersink piping, the fasteners have to be cut or broken away to allow removal of the insulation pieces from the pipes. Thus, new fasteners will often be necessary for re-installing the insulation. Since the plumber doing the work on the pipes is probably not the one who originally installed the insulation, it is unlikely that he would have the necessary fasteners readily available. Therefore, he will have to find additional fasteners or leave the pipes uninsulated. The first alternative, and time associated therewith, increases the expense of the plumbing repair, the latter alternative is unacceptable.

Therefore, it is an objective of this invention to eliminate or reduce the drawbacks associated with prior art insulation devices for covering undersink piping. It is particularly an objective to address the drawbacks associated with prior art fastening structures for undersink insulation.

It is an objective of the invention to eliminate the need for a large number of separate fastening structures for securing insulation pieces to the pipe. It is specifically an objective to reduce the hassle and time required to install the insulation pieces and to thus increase the cost efficiency and reduce the overall costs of the installation process.

It is another objective of the invention to improve the overall aesthetics of the insulation pieces.

It is still another objective to reduce the capture of dirt and germs by the pieces and fasteners and to therefore provide a cleaner, more sanitary bathroom environment.

It is an objective of the invention to ensure proper installation and to eliminate gaps in the insulation pieces and exposure of portions of the pipes.

It is another objective to simplify the removal of undersink insulation pieces to provide access to the piping and to provide easy re-insulation of the piping.

SUMMARY OF THE INVENTION

The above objectives and drawbacks of the prior art are addressed by the present invention which comprises an insulative cover piece for insulating a pipe of a P-trap drain piping assembly which includes fastening structures operably coupled to the cover piece to thus eliminate the need for a plurality of separate fasteners which are subject to being lost or otherwise misplaced. The present invention provides cover pieces which may be easily installed without the need for separate fasteners and which may be removed and re-installed without the need for new fasteners.

To that end, the insulative cover piece of the invention comprises an elongated body formed of a flexible insulating material and configured for being positioned over a pipe of the undersink assembly. In a preferred embodiment of the invention, the body is dividable into separate cover pieces including a cover piece which terminates in a 180° bend for covering the straight and J-shaped pipes of the piping assembly and a cover piece which terminates in approximately 90° bend for covering the L-shaped pipe of the assembly. A longitudinal slit is formed in the body and defines opposing edges on either side of the slit. The body is spreadable along the longitudinal slit for positioning the various cover pieces over the respective pipes. A fastening structure is connected to the body proximate an edge of the longitudinal slit. The fastening structure is operable for being engaged with the other slit edge for holding the edges of the longitudinal slit together to effectively close the slit. In that way, the pipes of the piping assembly may be quickly and efficiently covered and insulated without the need for a plurality of separate fasteners.

In one embodiment of the invention, the fastening structure includes rigid threaded bolts which extend outwardly from an edge. The other edge includes apertures formed therein for receiving the bolts. When the edges of the slit are brought together, the bolts span across the slit and portions of the bolts are operably configured to be pushed into the respective apertures. The apertures include threads which frictionally engage the threaded bolts and thereby hold the bolts therein to effectively close the longitudinal slit. Preferably, the bolts and corresponding apertures are positioned along the length of the longitudinal slit for proper closure of the slit on a respective pipe.

The edges of the slit are configured to cover at least a portion of each bolt and preferably the entire bolt to effectively hide the bolt when the longitudinal slit is closed. The present invention thereby gives a clean outward appearance and since the fastening structures are covered, they are less likely to trap dirt and germs within the bathroom environment. Since the fastening structures are connected to the cover piece, no separate fasteners are necessary and proper installation is always insured. In other words, each fastening structure is in position for properly closing the slit and an installer is generally forced to make a proper installation to effectively insulate the pipes.

In an alternative embodiment of the invention, the fastening structure includes a tab positioned on one edge which fits into a slot formed on the other edge. The slot is configured for receiving the tab and effectively holding the tab therein to close the longitudinal slit. The tab spans across the slit when the edges thereof are brought together and the tab is operably configured to be manually pushed into the respective slot. A single tab and slot arrangement extending along a substantial portion of the length of the slit might be used. Alternatively, multiple tabs and slots might be used at spaced positions along the length of the slot.

In still another embodiment, the fastening structure includes a flange on one edge of the slit. A slotted portion is formed proximate the other edge of the longitudinal slit. The slotted portion has a slot formed therein which is configured for engaging and receiving the flange to effectively close the longitudinal slit. The slotted portion and flange are operably configured to be manually positioned together for closing the slit. The slotted portion may include a second fastening structure which extends inwardly of the slot and engages the flange and, more particularly, fits into an opening or aperture formed in the flange for further holding the edge and closing the slit.

The present invention eliminates the need for separate fastening elements which are subject to being lost or misplaced, and the cover pieces of the invention may be manually installed without the need for special tools. Therefore, the invention reduces the hassle and time required to install the insulation pieces and thus increases the cost efficiency of the overall installation process. Furthermore, the invention improves the overall aesthetics of the insulation piece and insures proper installation and re-installation when the cover pieces have to be removed. Still further, the smooth outward appearance produced by the invention reduces captured dirt and germs thereon and provides a cleaner, more sanitary bathroom environment.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1:
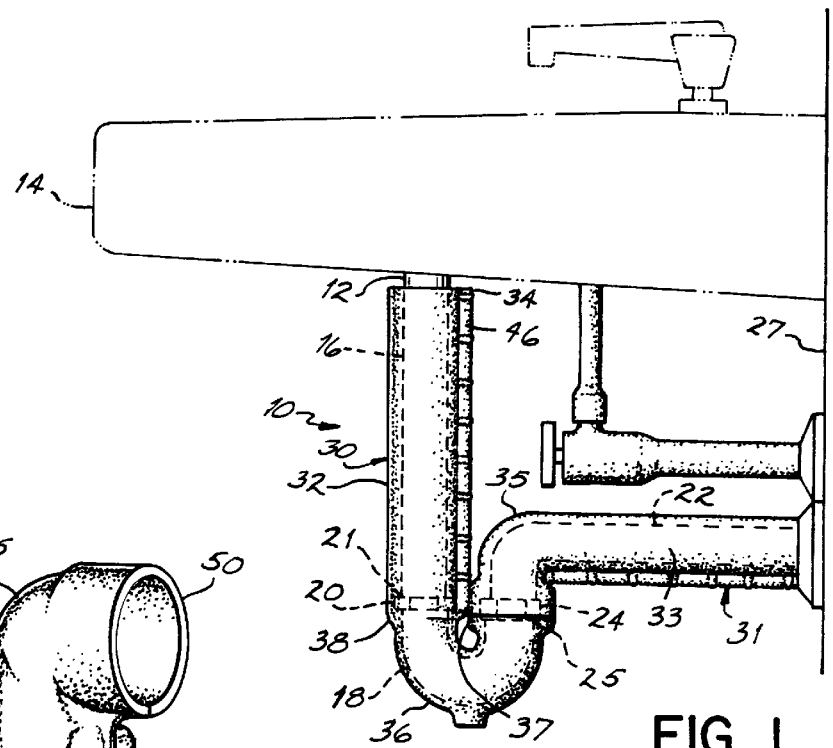
FIG. 1 is a side-view of an undersink piping assembly covered with the insulated cover assembly of the invention.

FIG. 1 illustrates the insulative cover assembly 10 of the present invention as installed on a P-trap drain piping assembly 12 underneath a sink 14. The insulative cover assembly 10 is positioned on the drain piping assembly 12 in order to cover and insulate the piping and reduce or prevent burns and abrasions of a handicapped person in a wheelchair coming into contact with the piping. The drain piping assembly 12 under sink 14 essentially comprises three pipes shown by dashed lines. A straight pipe 16 extends downwardly from the sink drain (not shown) and attaches to one side of a J-shaped pipe or "trap" pipe 18, which is attached to straight pipe 16 by a pipe nut 20 at the juncture 21 between the pipes 16, 18. An L-shaped pipe 22 is joined to the other side of the J-shaped pipe 18 by a similar pipe nut 24 at juncture 25. The L-shaped pipe 22 extends back into the wall to dispose of waste water draining from sink 14. Juncture 21 is the forwardmost juncture from the wall 27 which supports sink 14 and piping 12 and thus is referred to herein as a forward juncture. Juncture 25 is a rearward juncture.

The insulative cover assembly 10 includes a first cover piece 30. First cover piece 30 has a generally elongated body with a generally linear portion 32 making up a substantial portion of its length. When the first cover piece 30 is placed over pipes of the drain piping assembly 12, an end 34 of linear portion 32 abuts generally against the bottom of the drain of sink 14 (see FIG. 1). The other end of the first cover piece 30 terminates in an approximately 180° bend portion 36 which extends from end 38 of the linear portion 32. The first cover piece 30 has a longitudinal slit 40 along its length from the first end 34 of linear portion 32 to an end 37 of the bend portion 36 for being spread apart and positioned over the pipes 16, 18.

A second cover piece 31 covers the L-shaped pipe 22. Second cover piece 31 has a body including linear portion 33 and terminating in an approximately 90° bend portion 35. The 90° bend portion 35 couples and abuts with end 37 of the first cover piece to cover juncture 25 and thus provides complete insulation of pipe assembly 12. A longitudinal slit 40 allows the second cover piece 31 to be spread apart and installed over the respective pipe in a manner similar to the first cover piece 30.

Figure 2:
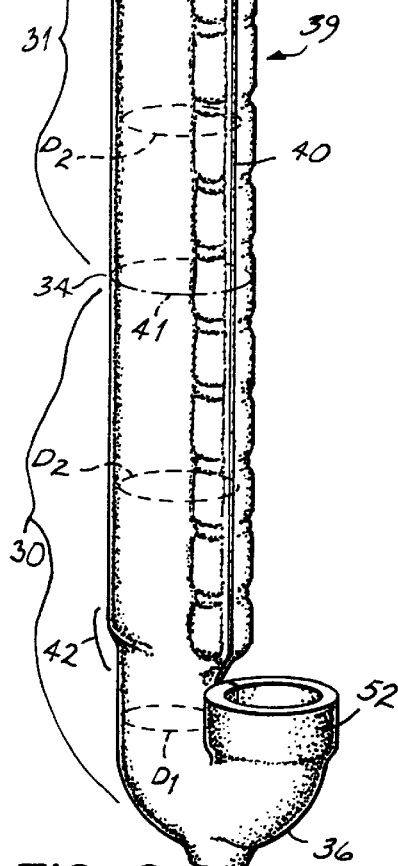
FIG. 2 is a perspective view of an embodiment of the present invention.

FIG. 2 is a perspective view of the first cover piece 30 and second cover piece 31 coupled together to form a unitary body 39. Unitary body 39 may be shipped as shown in FIG. 2 and includes all of the necessary cover pieces for covering and insulating piping assembly 12. The unitary body 39 preferably has a generally circular cross-section for a proper fit on the pipes and is separateable or dividable into the individual cover pieces 30, 31, such as by cutting along line 41.

As illustrated in FIGS. 1 and 2, bend portion 36 of the first cover piece 30 is configured to have an inner diameter $D_1$ which is generally close in dimension to the outer diameter of the J-shaped pipe 18 such that there is very little room for the bend portion 36 to move or shift on the J-shaped pipe 18 when cover assembly 10 is installed. However, the J-shaped pipe 18 is joined to straight pipe 16 by pipe nut 20, which has a larger outer diameter than both the J-shaped pipe 18 and the straight pipe 16. Straight pipe 16 usually has an outer diameter similar to the outer diameter of the J-shaped pipe 18.

To provide proper installation, linear portion 32 of the first cover piece 30 increases to a larger inner diameter $D_2$ at a transition region 42. Linear portion 32 increases from the first diameter $D_1$ of the 180° bend portion to a larger second diameter $D_2$, so that the first cover piece 30 can be positioned over the larger diameter pipe nut 20 and so that cover piece 30 simultaneously and continuously covers pipes 16, 18, pipe nut 20 and juncture 21. Linear portion 32 maintains the increased diameter $D_2$ from transition region 42 up to the end 34 where it joins with the second cover piece 31 to form the unitary body 39 (see FIG. 2). In a preferred embodiment of the invention, transition region 42 is gradually increased in diameter from $D_1$ to $D_2$ to give a smooth appearance.

Second cover piece 31 has the linear portion 33 which maintains the inner diameter $D_2$ until the 90° bend portion 35 where it increases to form an enlarged end portion or collar 50 at an end of the bend. Referring to FIG. 2, the first cover piece 30 also has an end portion or collar 52 positioned proximate an end of the 180° bend portion 36. Collar 52 is approximately equal in dimension to $D_2$ so that the collar 52 covers juncture 25 and pipe nut 24 as illustrated in FIG. 1. Collar 50 is dimensioned to also have an inner diameter approximately equal to $D_2$ so as to cover nut 24 and juncture 25 and abut against collar 52. The cover pieces 30, 31 and abutting collars 50, 52 provide complete insulative coverage of the piping assembly.

Referring to FIG. 2, unitary body 39, which comprises the first cover piece 30 and the second cover piece 31, may be shipped and distributed as a single piece and will yield two separate cover pieces 30, 31. To that end, unitary body 39 includes a first section (corresponding to the first cover piece 30) and a second section (corresponding to the second cover piece 31). For reference herein, the first cover piece or first section 30 and the second cover piece or second section 31 will be given similar reference numerals, although the term "section" generally refers to parts of the unitary body 39 while "pieces" refers to the separate cover pieces and measured and formed from the unitary body 39 in accordance with the invention.

Figure 3:
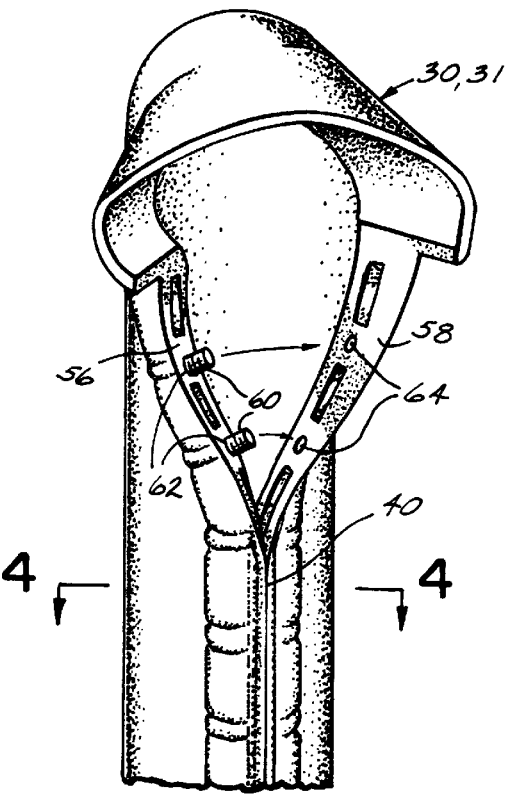
FIG. 3 is a perspective view of the embodiment illustrated in FIG. 2 shown spread along the longitudinal slit.

Referring to FIG. 3, the unitary body 39 and thus each separate cover piece 30, 31 includes opposing edges 56, 58 defined by longitudinal slit 40. In accordance with the principles of the invention, fastening structures are connected to one edge of the slit and are configured for being engaged with the other edge of the slit to hold the edges together and effectively close the longitudinal slit. More specifically, edge 56 includes a plurality of rigid fastening structures or bolts 60 which are positioned along edge 56 and held thereto. Preferably, the bolts 60 fit into corresponding mounting apertures 62 formed in edge 56 and are held therein to be connected with the respective cover piece. In a preferred embodiment, the mounting apertures 62 which receive the bolts 60 are formed to have internal threads 63 and the bolts 60 are threaded and are screwed or pushed into the apertures 62 for connection with the cover piece. In that way, the bolts are always with the cover piece and separate fasteners are not necessary. Alternatively, an adhesive might be utilized to hold the bolts 60 in the mounting apertures 62 to thereby connect the bolts to the cover pieces. Furthermore, the bolts might be integrally formed with the edge 56 of the cover piece to actually be part of the cover piece.

Edge 58 includes a plurality of respective receiving apertures 64 which are configured to receive the bolts 60 and hold the bolts therein, such as by friction. In that way, the longitudinal slit is effectively closed as illustrated in FIGS. 2 and 3.

Figure 4:
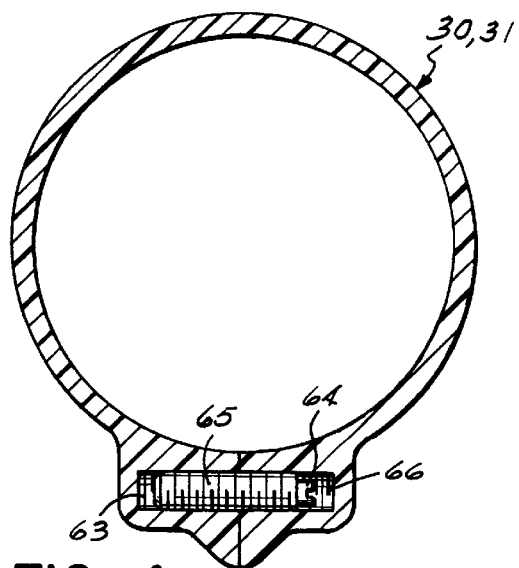
FIG. 4 is a cross-sectional view taken along lines 4—4 of FIG. 3.

Referring to FIG. 4, a cross-sectional view of a cover piece of the invention is shown with the longitudinal slit closed. To install a particular cover piece on a respective pipe, the cover piece is spread along longitudinal slit 40 (see FIG. 3) and is positioned over the respective pipe or pipes. The cover pieces are preferably formed of a flexible insulative material such as Plastisol. Once the cover piece is in place on the pipe, the edges 56, 58 are brought together such that the bolts span across the slit 40. The bolts 60 are then manually or otherwise pushed into the receiving apertures 64. Preferably, the receiving apertures 64 also have threads 66 formed therein to engage the threads 65 on the bolt 60. The engagement between the aperture threads 66 and the bolt threads 65 insures that the bolt stays in the aperture and that the longitudinal slit remains closed. To remove the cover piece, the longitudinal slit 40 is again opened by spreading the edges 56, 58 apart and pulling the bolts 60 from the receiving apertures 64. In a preferred embodiment, the bolts are made of a plastic which is harder and more rigid than the material of the cover piece. As mentioned above, the cover piece is made of a flexible insulative material, such as Plastisol, and thus the threads 66 in the receiving aperture 64 will flex and bend to allow passage of the harder threads 65 on bolt 60. In that way, the installation and removal of the cover piece is quick and easy and may be accomplished manually without the need for special tools.

The bolts 60 of the present invention are connected to the bodies of the cover pieces and therefore remain with the cover pieces as they are manipulated and installed. Therefore, no separate fasteners are needed with the insulative cover pieces of the invention and loss or misplacement of fasteners is eliminated. When the bolts 60 are pushed into the receiving apertures 64, they automatically engage and hold the edges 56, 58 together to close the slit. In accordance with the principles of the invention, a fastening structure connected to one side of the slit is engaged with an aperture on the other side of the slit to span across the slit and keep the slit closed to secure the cover piece.

In accordance with another feature of the invention, the edges 56, 58 are configured to cover at least a portion of the fastening structure to effectively hide the fastening structure when the slit is closed. Preferably, the edges cover effectively the entire bolt 60 to hide the bolt when the longitudinal slit is closed (see FIGS. 2 and 4). That is, one side of the bolt is covered inside the mounting apertures 62 when the slit is opened, and when the slit is closed, the receiving apertures generally cover the remaining side of the bolt. In that way, the installed cover pieces have a clean smooth outer surface to reduce the accumulation of dirt and germs thereon. No exposed fasteners are used which might trap dirt as with the prior art. As such, the invention provides a cleaner and more sanitary bathroom environment.

The illustrations of FIGS. 3 and 4 show the bolts connected with the cover piece by being screwed into the mounting apertures 62 and then insertable and removable in the receiving apertures 64. Alternatively, and assuming that the receiving apertures 64 include threads 66, the bolts might be screwed into the receiving apertures 64 to be inserted and removed in the apertures designated by numeral 62. Still further, threads 66 might eliminated and the bolt 60 might be held in aperture 62 by an adhesive substance or integrally formed with the cover piece.

In accordance with the invention, the bolts or fasteners should be sufficiently anchored or connected with one edge so as not to pull out of that edge when the slit is again spread apart and the cover pieces are removed. That is, it is preferable that the bolts remain generally connected to one edge and easily removable only from the other edge. In that way, the risk of the bolts falling out of the mounting apertures and being separated from the cover pieces is reduced.

Figure 5:
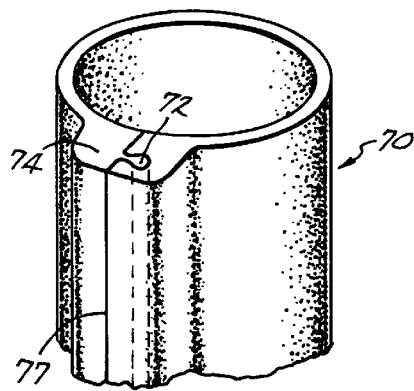
FIG. 5 is a perspective view, in section, of an alternative embodiment of the invention.
Figure 6:
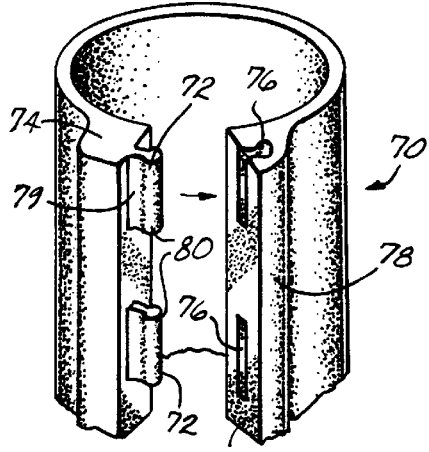
FIG. 6 is a perspective view of the embodiment of FIG. 5 shown spread apart along the longitudinal slit

FIGS. 5 and 6 illustrate an alternative embodiment of the invention. The cover piece 70 has a fastening structure or tab 72 formed along edge 74. The tab 72 extends outwardly from edge 74 and is configured to be received by slot 76 formed in the opposing edge 78. The tab 72 may be manually or otherwise pushed into the slot 76. Tab 72 and slot 76 are configured such that when the tab engages the slot, it is held therein for effective closure of the longitudinal slit.

For example, as illustrated in FIGS. 5 and 6, the tab 72 might have an elongated but narrow outward base portion 79 and a wider head portion, such as cylindrically shaped head portion 80, which fits within a correspondingly shaped portion of the slot 76. In that way, the tab 72 will slide past a narrow portion of the slot 76 and will essentially snap or seat within the slot 76 for proper closure along the length of the longitudinal slit 77. As may be appreciated, the tab might take forms other than that shown in the figures. The tab 72 effectively spans across the slit 77 when the edges 74, 78 are brought together to close the slit.

FIG. 5 illustrates the tab and slot as extending along a substantial portion of the length of the slit 77. Alternatively, the fastening structure may include a plurality of shorter tabs 72 in respective slots 76 positioned at intervals along the length of longitudinal slit 77 as illustrated in FIG. 6. In accordance with the principles of the invention, the tabs 72 and slots 76 eliminate the need for separate fasteners and allow the cover pieces to be easily and quickly installed simply by manually pressing the opposing edges 74, 78 together. Furthermore, the edges can be pulled apart to remove the cover piece and re-installation will not require additional fastening structures. In a preferred embodiment, the tab and slot are integrally formed with the cover piece, although they might be otherwise formed and connected to the cover piece.

Figure 7:
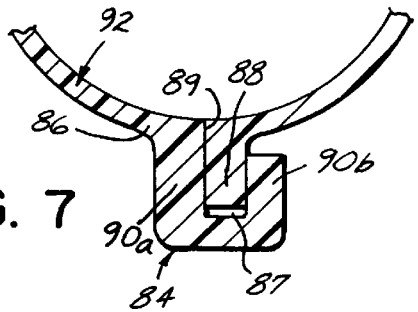
FIG. 7 is a partial cross-sectional view of an alternative embodiment of the invention.
Figure 8:
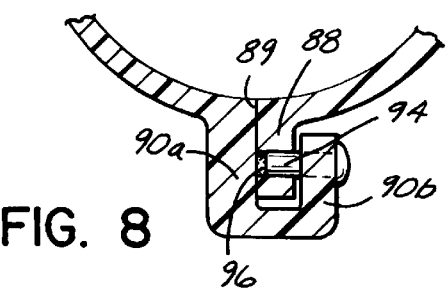
FIG. 8 is a partial cross-sectional view of an alternative embodiment of the invention.

FIGS. 7 and 8 illustrate another embodiment of the invention which includes a slotted portion 84 formed proximate an edge 86 of the cover piece. The slotted portion includes an aperture or slot 87 formed therein which is configured for receiving a fastening structure on the opposing edge of the cover piece and effectively closing the longitudinal slit 89. As illustrated in FIG. 7, the opposing edge includes a flange 88 which is preferably dimensioned and configured to slide or otherwise fit within slot 87 of slotted portion 84. The sidewalls 90a, 90b of the slotted portion 84 confine flange 88 and effectively close longitudinal slit 89 to secure the cover piece 92. When the slotted portion 84 and the flange 88 are brought together for being engaged, the slotted portion cooperates with the flange to effectively span across the slit 89 and close the slit. The slotted portion 84 and respective flange 88 may extend along a substantial portion of the length of cover piece 92 and slit 89. Alternatively, and similar to the embodiment illustrated in FIG. 6, a plurality of individual slotted portions and flanges may be positioned and spaced along the length of the longitudinal slit 89.

The slotted portion 84 and flange 88 in FIG. 7 are shown to essentially frictionally engage each other for keeping the slit closed. To further insure a proper closure of the longitudinal slit 89, a second fastening structure may be utilized in conjunction with the slotted portion to insure proper engagement with the opposing flange 88 of the cover piece. Referring to FIG. 8, the second fastening structure may be an integral rivet-like or bolt-like structure 94 which extends inwardly into slot 87 from one of the sidewalls 90a, 90b of the slotted portion. In the embodiment illustrated in FIG. 8, the bolt-like structure extends inwardly from sidewall 90b. The opposing flange 88 includes an aperture 96 formed therein to receive bolt 94. In that way, when flange 88 is positioned in slot 87, the bolt 94 fits into aperture 96 and further secures the opposing edges to close the slit. Preferably, the slotted portion 84 is flexible so that sidewall 90b may be pulled away from sidewall 90a to position flange 88 in the slot 87. Sidewall 90b then returns to a rest position wherein bolt-like structure 94 extends into the aperture 96. Preferably, a plurality of the bolts 94 will be positioned and spaced along the slotted portion 84 and along the length of the slit 89 to engage a plurality of apertures 96 formed in flange 88 and securely close the longitudinal slit 89.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. An insulative cover assembly for insulating a pipe of a P-trap drain piping assembly located under a sink including a straight pipe, a J-shaped pipe, and an L-shaped pipe joined together at junctures by pipe nuts, the cover assembly comprising:

a first cover piece having an elongated body and terminating in an approximately 180° bend at one end thereof, a longitudinal slit formed in the first cover piece and defining opposing edges, the first cover piece being spreadable along the slit for positioning the cover piece over straight and J-shaped pipes joined at a juncture;

a second cover piece having an elongated body and terminating in an approximately 90° bend at one end thereof, a longitudinal slit formed in the second cover piece and defining opposing edges, the second cover piece being spreadable along the slit for positioning the cover piece over an L-shaped pipe;

a fastening structure connected to at least one of the cover pieces on one side of the longitudinal slit, the fastening structure configured for being operably engaged with an aperture on the other side of the slit when the two edges of the slit are brought together and operable to assist in holding said edges together to effectively close the slit;

whereby the pipe of the piping assembly is quickly and efficiently covered and insulated without the need for separate fasteners.

2. The insulative cover piece of claim 1 wherein the fastening structure includes a rigid bolt extending outwardly from the edge, the aperture configured to receive a portion of the bolt to effectively close the longitudinal slit.

3. The insulative cover piece of claim 1 wherein the aperture frictionally engages the structure and holds said structure therein.

4. The insulative cover piece of claim 1 further comprising a plurality of fastening structures and respective apertures positioned along the length of the longitudinal slit.

5. The insulative cover piece of claim 1 wherein the edges of the longitudinal slit are configured to cover at least a portion of the fastening structure to effectively hide said portion of the fastening structure when the longitudinal slit is closed.

6. The insulative cover piece of claim 1 wherein the fastening structure includes a tab, the aperture comprising a slot formed in said other edge which is configured for receiving the tab for effectively closing the longitudinal slit.

7. The insulative cover piece of claim 6 wherein the tab extends along a majority of the length of the longitudinal slit.

8. The insulative cover piece of claim 6 further comprising a plurality of tabs and corresponding slots positioned along the length of the longitudinal slit.

9. The insulative cover piece of claim 1 further comprising a plurality of fastening structures and corresponding apertures positioned along the longitudinal slit.

10. The insulative cover piece of claim 1 wherein the fastening structure includes flange proximate an edge, the aperture including a slotted portion having a slot formed therein and configured for receiving the flange for effectively closing the longitudinal slit.

11. The insulative cover piece of claim 10 wherein the slotted portion further includes a second fastening structure extending inwardly of the slot, the second fastening structure engaging said flange for closing the slit.

12. The insulative cover piece of claim 11 wherein said flange includes an opening for receiving the second fastening structure.

13. An insulative cover piece for insulating a pipe of a P-trap drain piping assembly located under a sink, the cover piece comprising:

an elongated body formed of a flexible insulating material, the body being configured for positioning over a pipe of the undersink assembly;

a longitudinal slit formed in the body and defining opposing edges, the body being spreadable along the slit for positioning the body over said pipe;

a fastening bolt coupled to the body proximate an edge of the longitudinal slit, the fastening bolt extending outwardly from the edge;

a receiving aperture formed proximate the other edge, the receiving aperture configured for operably receiving a portion of the fastening bolt when the two edges of the slit are brought together such that the bolt spans across the slit, the aperture operable for holding the bolt portion therein to hold said edges together and effectively close the slit;

whereby the pipe of the piping assembly is quickly and efficiently covered and insulated without the need for separate fasteners.

14. The insulative cover piece of claim 13 wherein the receiving aperture frictionally engages the fastening bolt for holding the bolt therein.

15. The insulative cover piece of claim 13 wherein the receiving aperture is configured to cover at least a portion of the bolt to effectively hide said bolt portion when the longitudinal slit is closed.

16. The insulative cover piece of claim 14 wherein the receiving aperture includes a plurality of threads for frictionally engaging the bolt portion.

17. The insulative cover piece of claim 13 wherein the bolt has a plurality of threads thereon, the edge including a threaded mounting aperture for receiving the threaded bolt.

18. An insulative cover assembly for insulating a pipe of a P-trap drain piping assembly located under a sink including a straight pipe, a J-shaped pipe, and an L-shaped pipe joined together at junctures by pipe nuts, the cover assembly comprising:

a first cover piece having an elongated body and terminating in an approximately 180° bend at one end thereof, a longitudinal slit formed in the first cover piece and defining opposing edges, the first cover piece being spreadable along the slit for positioning the cover piece over straight and J-shaped pipes joined at a juncture;

a second cover piece having an elongated body and terminating in an approximately 90° bend at one end thereof, a longitudinal slit formed in the second cover piece and defining opposing edges, the second cover piece being spreadable along the slit for positioning the cover piece over an L-shaped pipe;

a fastening structure connected to at least one of the cover pieces on one side of the longitudinal slit, the fastening structure extending from the edge to span across said slit when the opposing edges are brought together;

an aperture formed in the cover piece on the other side of the slit and configured for operably receiving a portion of the fastening structure spanning across the slit to hold said edges together and effectively close the slit;

whereby the pipe of the piping assembly is quickly and efficiently covered and insulated without the need for separate fasteners.

19. The insulative cover piece of claim 18 wherein the fastening structure includes a bolt extending from the edge, the aperture being configured to receive and frictionally hold the bolt therein for holding the edges together.

20. The insulative cover piece of claim 18 wherein the fastening structure includes a tab and the aperture is a slot configured to receive the tab therein for holding the edges together.

21. The insulative cover piece of claim 18 wherein the fastening structure includes a flange proximate an edge, the aperture including a slotted portion having a slot formed therein and configured for receiving the flange for effectively closing the longitudinal slit.

22. The insulative cover piece of claim 21 wherein the slotted portion further includes a second fastening structure extending inwardly of the slot, the second fastening structure engaging said flange for closing the slit.

23. The insulative cover piece of claim 22 wherein the flange includes an aperture therein for receiving the second fastening structure.

* * * * *